United States Patent [19]
Toosky et al.

[11] Patent Number: 5,860,779
[45] Date of Patent: Jan. 19, 1999

[54] LOCKING NUT

[75] Inventors: Rahmatollah F. Toosky, Laguna Niguel; Scott Forrest, Santa Anna, both of Calif.

[73] Assignee: McDonnell Douglas Corporation, Huntington Beach, Calif.

[21] Appl. No.: 979,298

[22] Filed: Nov. 26, 1997

[51] Int. Cl.⁶ .............................. F16B 33/00; F16B 37/08
[52] U.S. Cl. .................. 411/432; 411/178; 411/369; 411/438; 411/542
[58] Field of Search ...................... 411/178, 366, 411/368, 369, 432, 438, 542

[56] References Cited

U.S. PATENT DOCUMENTS

| | | | |
|---|---|---|---|
| Re. 24,753 | 12/1959 | Rohe | 174/138 |
| 1,204,500 | 11/1916 | Sharp . | |
| 1,476,455 | 12/1923 | Marye . | |
| 2,354,810 | 8/1944 | Haas et al. | 411/438 |
| 2,518,468 | 8/1950 | Harding . | |
| 3,081,808 | 3/1963 | Rosán et al. . | |
| 3,190,169 | 6/1965 | Rosán et al. . | |
| 3,220,454 | 11/1965 | Neuschotz . | |
| 3,279,519 | 10/1966 | Neuschotz . | |
| 3,319,690 | 5/1967 | Rosán et al. . | |
| 3,405,591 | 10/1968 | Neuschotz . | |
| 3,550,498 | 12/1970 | Briles | 411/432 |
| 4,040,326 | 8/1977 | Breed | 411/438 X |
| 4,655,660 | 4/1987 | McGlone et al. | 411/432 X |
| 4,904,136 | 2/1990 | Matsumoto. | 411/366 X |
| 4,971,497 | 11/1990 | Stoffer et al. | 411/178 X |
| 5,033,925 | 7/1991 | Moghe | 411/366 |
| 5,066,180 | 11/1991 | Lang et al. | 411/178 X |
| 5,564,875 | 10/1996 | Matthews | 411/428 |
| 5,622,465 | 4/1997 | Junkers | 411/432 |

OTHER PUBLICATIONS

Heli–Coil Screw Thread Inserts Standard and Screw–Lock—Metric Coarse and Fine Series, undated, admitted prior art.
Heli–Coil Screw Thread Inserts, pp. 1–2, admitted prior art.

*Primary Examiner*—Neill Wilson
*Attorney, Agent, or Firm*—Senniger, Powers, Leavitt & Roedel

[57] ABSTRACT

A locking nut for use with a bolt for connecting members together. The bolt has a head and a shank. The members are disposed between the head and the nut when the locking nut connects the members together. At least a portion of the shank has external threads formed thereon. The locking nut includes a shell having a bore extending therethrough for receiving the bolt. At least a portion of a wall of the bore has internal threads formed thereon. The shell is sized and shaped to permit rotation of the nut on the bolt for tightening the nut on the bolt. The nut further includes a generally tubular insert sized for being received in the bore of the shell. The insert has a threaded portion having an outer surface with external threads for threaded engagement with the internal threads of the shell, and an inner surface with internal threads for threaded engagement with the external threads of the bolt. The insert includes a locking portion constructed for interlocking the insert with the shell.

47 Claims, 10 Drawing Sheets

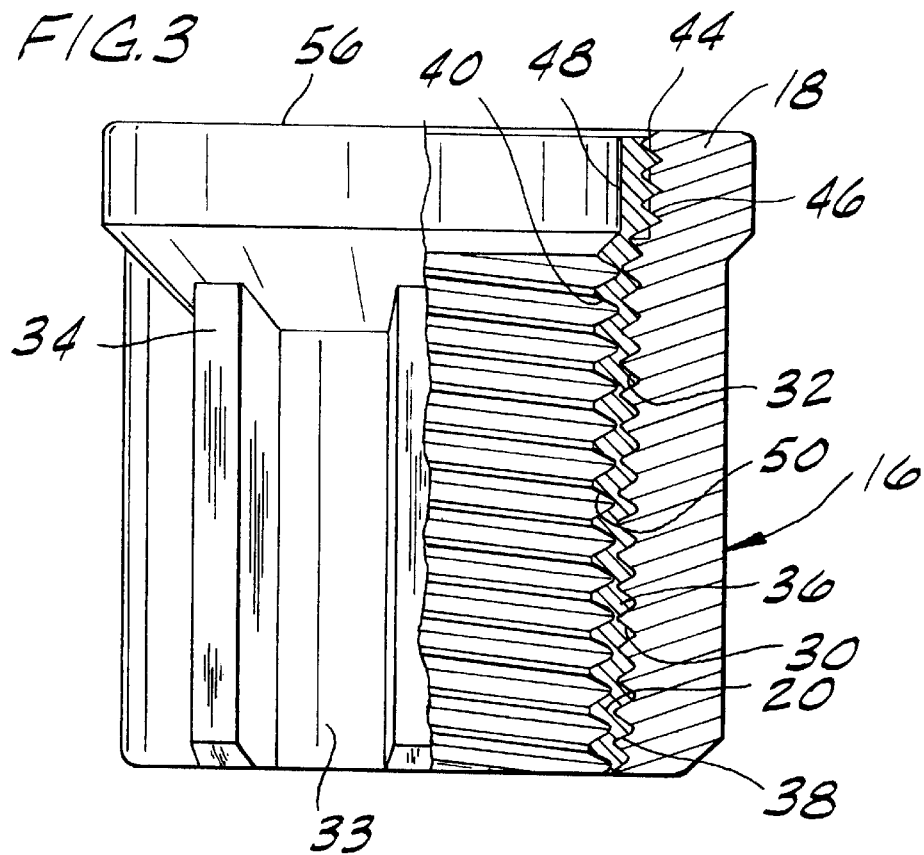
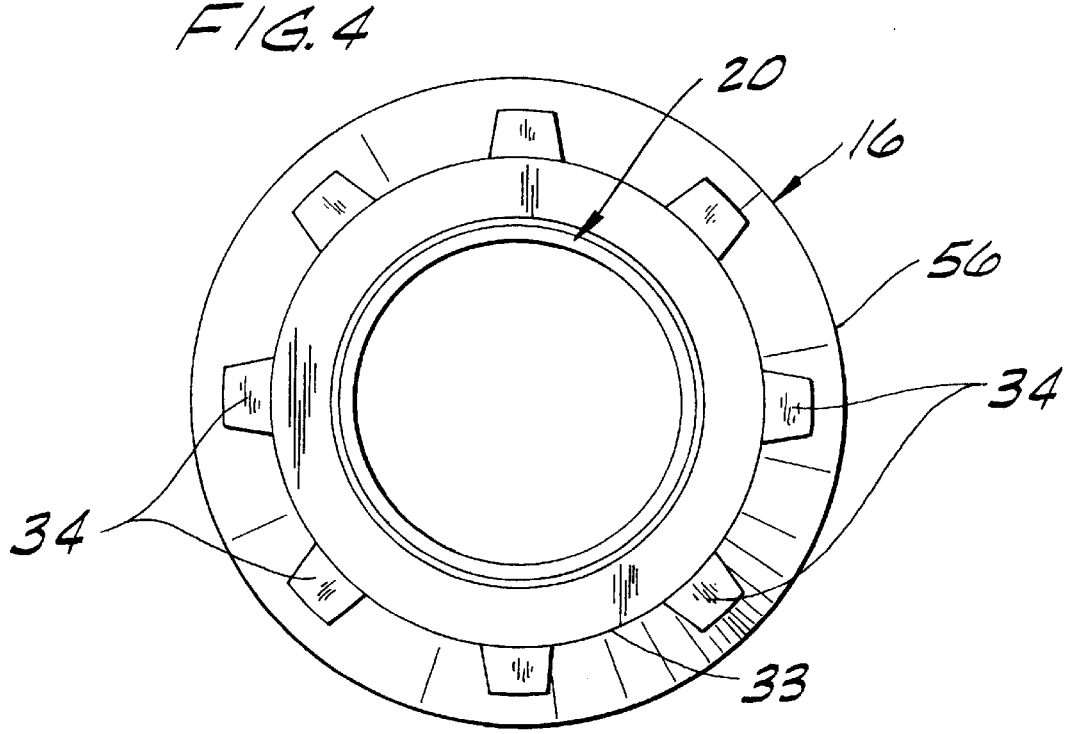

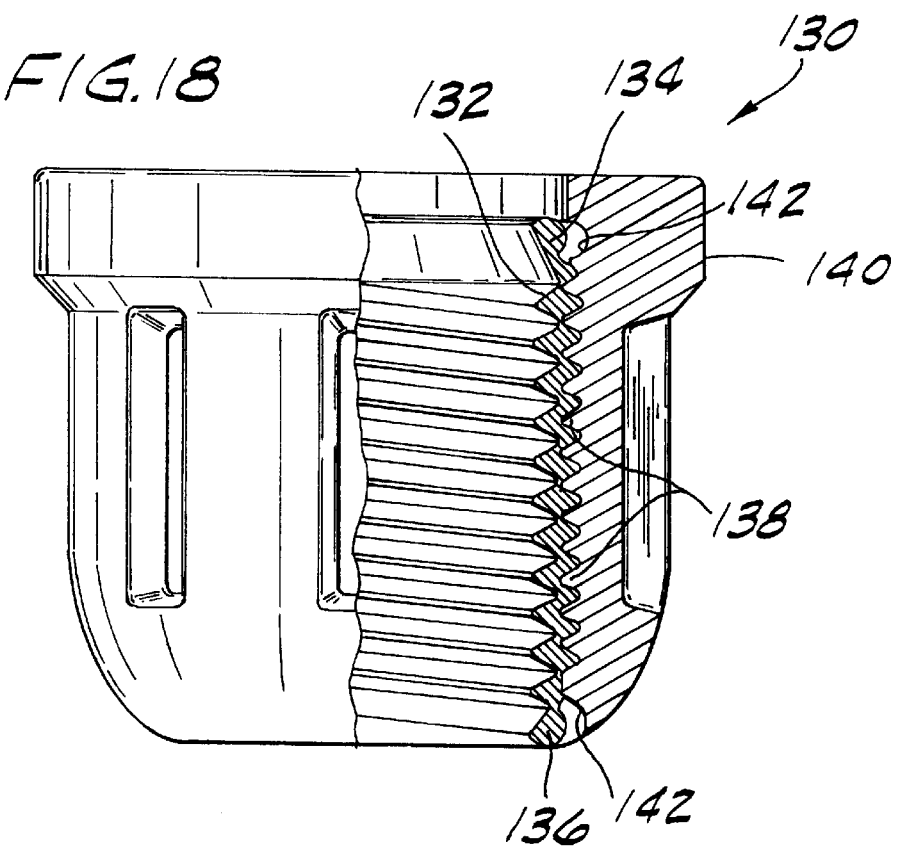
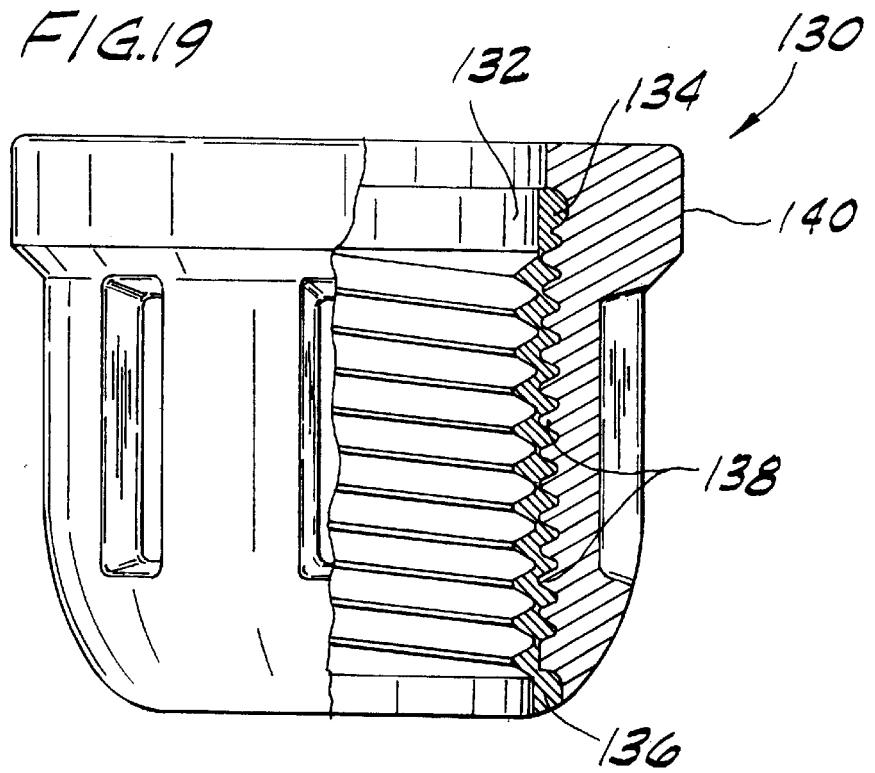

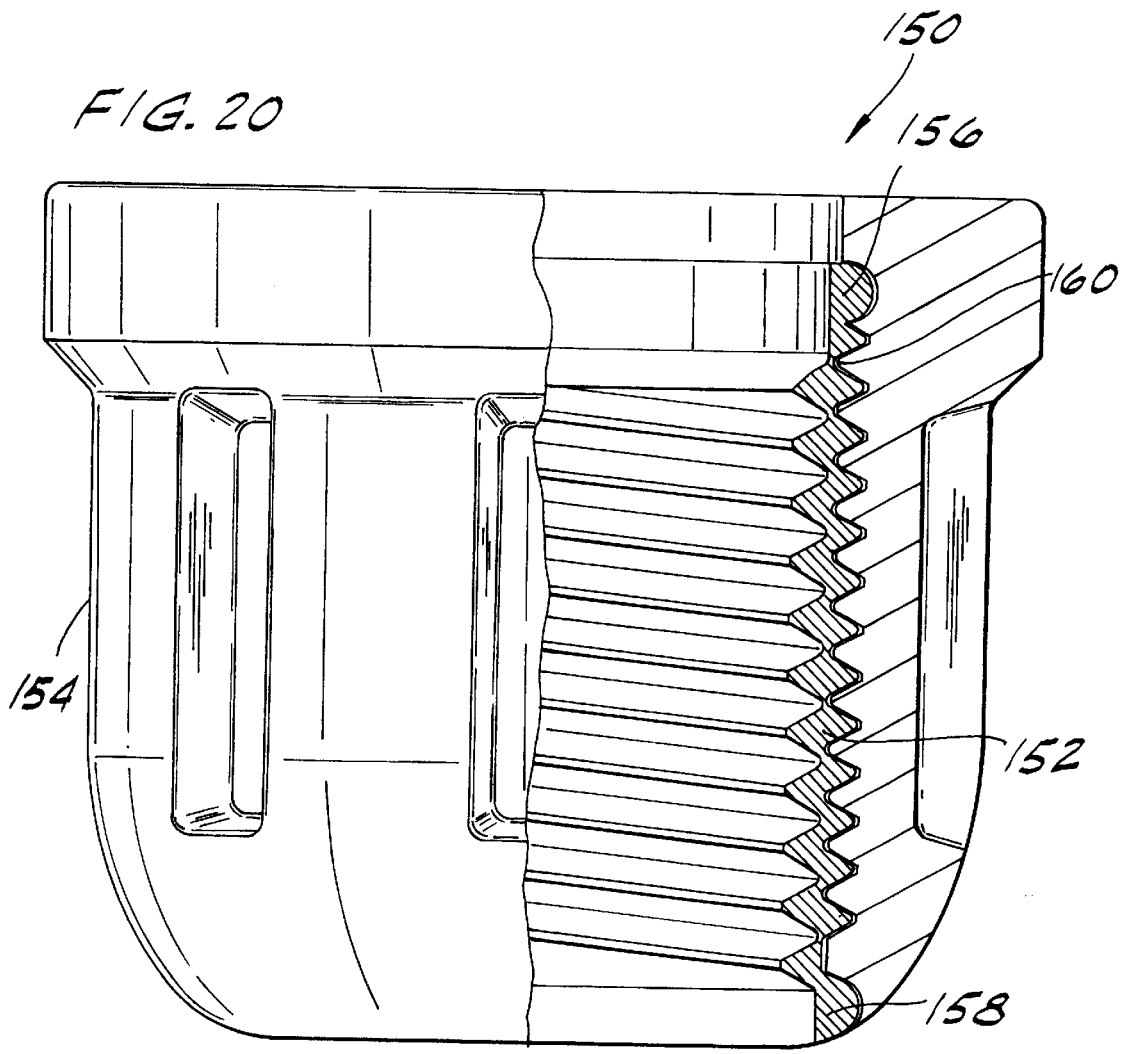

LOCKING NUT

BACKGROUND OF THE INVENTION

This invention relates generally to fasteners and, more particularly, to a locking nut having a threaded insert.

Fasteners which are used to connect structural members together in critical applications often require a locking feature to prevent the fastener from becoming loose, or the structural members from becoming separated. Loosening of the fastener is not only a problem due to possible detachment of the structural members, but on vehicles such as spacecraft or aircraft, loose parts of the fastener and associated components may cause a hazard by interfering with the operation of equipment. In addition to requiring a locking feature, fasteners used in spacecraft have additional design restrictions. The fasteners should be free of external plating to prevent possible contamination from the plating flaking off the fastener or reacting with the environment in a space vehicle or habitat. Moreover, the fasteners should be free of any sharp protrusions which may interfere with equipment or possibly damage an astronaut's space suit.

Currently available locking fasteners typically include a nut N and bolt B for connecting two or more structural members M together (FIG. 1). The nut N includes a locking thread T which is formed by crimping the last several threads on the end of the nut to provide a tight interference fit between the threads on the shank of the bolt B and internal threads on the nut to prevent loosening of the nut on the bolt due to vibration. The remaining portion of the nut must have sufficiently thick walls to provide adequate strength for tightening the nut on the bolt. Therefore, only the end of the nut has a thin wall to allow for crimping of the threads to form the locking threads. The location of the locking thread at the end of the nut requires the threaded shank of the bolt to extend beyond the end of the nut to provide adequate engagement of the bolt threads with the locking threads located at the end of the nut. In space station applications this introduces a hazard due to possible snagging of the astronaut's space suit on the sharp threaded ends of the bolt extending from the nut. For this reason, the ends of the bolts are typically encapsulated with a plastic sealant after installation of the fastener. This is time consuming and increases the cost of the spacecraft since a large number of fasteners are used throughout the spacecraft.

Furthermore, the fasteners are typically plated to provide lubrication during installation and to prevent galling caused by moving engagement of threaded surfaces during installation. Plating is typically applied over the entire fastener, including the exterior to eliminate costs associated with applying plating only to the threaded portion of the fastener. The plating on the exterior of the fastener, however, increases the potential for contamination. The atomic oxygen in the orbital environment of a space station often causes plating on the outer surfaces of the fastener to become oxidized and creates a contaminant which may damage nearby equipment. Oxidized silver plating, for example, causes formation of a black dust which can spread throughout the space station.

A prior art design which can be used to eliminate the plating contamination problem is a thin walled insert, such as the type disclosed in U.S. Pat. No. 3,081,808, which is incorporated herein by reference. These inserts are used to provide a threaded bore for receiving a bolt in a large structural member. Since the structural member is not movable relative to the bolt and takes the place of the nut, the bolt must be accessible to torque the bolt into the threaded bore.

SUMMARY OF THE INVENTION

The present invention overcomes the deficiencies of the prior art by providing a locking fastener which has plating only on internal surfaces of the nut which are not exposed to the environment. By eliminating the external plating on the fastener, the potential for contamination to adjacent equipment from the plating is minimized. Among the features of the present invention may be noted the provision of a fastener which provides for a locking internal thread to prevent loosening of the nut due to vibration. The locking internal thread may be located anywhere along the length of the nut or a plurality of locking threads may be used. Since the location of the locking thread is not restricted to the end of the nut, the locking thread does not require the shank of the bolt to extend beyond the end of the nut and the end of the nut has a smooth rounded surface. The rounded end of the nut reduces the possibility of damage to an astronaut's space suit by the fastener. The locking fastener overcomes the limitations of the prior art fasteners and provides a lightweight, reliable fastener which is easy to install and economical to manufacture.

The use of a thin walled insert between the bolt threads and the nut shell also acts to distribute the load of the tightened bolt over an extended axial length of the nut. Conventional nuts typically cause the load imposed by the tightened bolt to concentrate at one or one and a half bolt threads. Typically, these are the first threads engaged by the bolt. The concentration of the bolt's load on a few threads predictably leads to breaking at these threads. The present invention distributes the load of the tightened bolt axially along the insert, and hence axially along the nut shell. The insert acts a thin walled cylinder which is capable of small elongation upon application of load from a bolt thread to a thread of the insert. The elongation permits load to be applied to all of the threads along the length of the insert. Distribution of the bolt's load over a larger number of the bolt threads makes it much less likely that the bolt will be stressed to failure.

Similarly, a coiled wire insert used according to the present invention also provides an advantageous distribution of bolt load. The wire insert located in a threaded bore retains a degree of freedom to move slightly under load from the bolt. These small movements have the effect of distributing the load of the bolt more evenly between the nut shell and bolt than a rigid thread tapped into the nut shell. Although coil inserts have been widely considered solely for use in repair damaged threads, they also have an excellent capability for load distribution in an undamaged threaded connection. When installed properly into a careful design, the coiled wire insert can often provide a more survivable threaded connection to a bolt than a thread cut into a member to which the bolt is to be tightened.

Still another advantage of the present invention is the capability of the locked fastener to dissipate structure borne vibrational energy through microscopic frictional rubbing between the threads of the insert and the threads of the nut shell. Acoustic energy in particular is responsible for loosening threaded fasteners on aircraft and launch vehicles (rockets). Further, fastened joints which have loosened even slightly have reduced fatigue resistance. Hence the invention is capable of improving the fatigue lives of aerospace fastened joints. It is believed that soft silver plating on the insert also contributes to dampening of structure borne vibrational energy into the bolted joint in the same way lead foil is often used to dampen the transmission of acoustic energy through building walls.

Generally, a locking nut of the present invention is for use with a bolt for connecting members together. The bolt has a head and a shank. The members are disposed between the head and the nut when the locking nut connects the members together. At least a portion of the bolt shank has external threads formed thereon. The locking nut comprises a shell having a bore extending therethrough for receiving the bolt. At least a portion of a wall of the bore has internal threads formed thereon. The shell is sized and shaped to permit rotation of the nut on the bolt for tightening the nut on the bolt. The nut further comprises a generally tubular insert sized for being received in the bore of the shell and comprising a threaded portion having an outer surface with external threads for threaded engagement with the internal threads of the shell. An inner surface of the insert has internal threads for threaded engagement with the external threads of the bolt. The insert further has a locking portion constructed for interlocking the insert with the shell.

In another aspect of the present invention a locking nut for use with a bolt in connecting members together comprises a shell having a bore extending therethrough for receiving the bolt. The shell is sized and shaped to permit rotation of the nut on the bolt for tightening the nut on the bolt. The nut further includes an insert comprising a wire sized for being received in the bore of the shell. The wire forms internal threads for engagement with the external threads of the bolt. The wire has a locking portion located along a central portion of the insert to prevent loosening of the bolt due to vibration.

In yet another aspect of the invention, a locking fastener comprises a bolt having a head and a shank, at least a portion of the shank having external threads formed thereon. The fastener includes a shell having a bore extending therethrough for receiving the bolt. At least a portion of a wall of the bore has internal threads formed thereon. The shell is sized and shaped to permit rotation of the nut on the bolt for tightening of the nut on the bolt. The fastener further comprises an insert sized for being received in the bore of the shell. The insert has thread means for engagement with the external threads of the bolt, and a locking portion for preventing rotation of the insert within the shell. The thread means has a captive portion for preventing loosening of the bolt from the insert due to vibration. The captive portion is located along a central portion of the insert such that the threads of the bolt engage the captive portion of the insert and lock the bolt together with the insert and shell without the shank extending beyond an end of the shell.

Other objects and features will be in part apparent and in part pointed out hereinafter.

BRIEF DESCRIPTION OF THE DRAWINGS

FIG. 3 is a partial cross-sectional view of a locking nut of the fastener of FIG. 2 with parts being broken away to show a shell and an insert of the nut;

FIG. 4 is a top view of the locking nut of FIG. 3;

FIG. 18 is a partial cross sectional view of an eighth embodiment of locking nut of the present invention;

FIG. 19 is the locking nut of FIG. 18 showing an insert of the nut locked into the shell; and FIG. 20 is a partial cross sectional view of a ninth embodiment of a locking nut of the present invention.

Corresponding reference characters indicate corresponding parts throughout the several views of the drawings.

DESCRIPTION OF THE PREFERRED EMBODIMENTS

Figure 1:
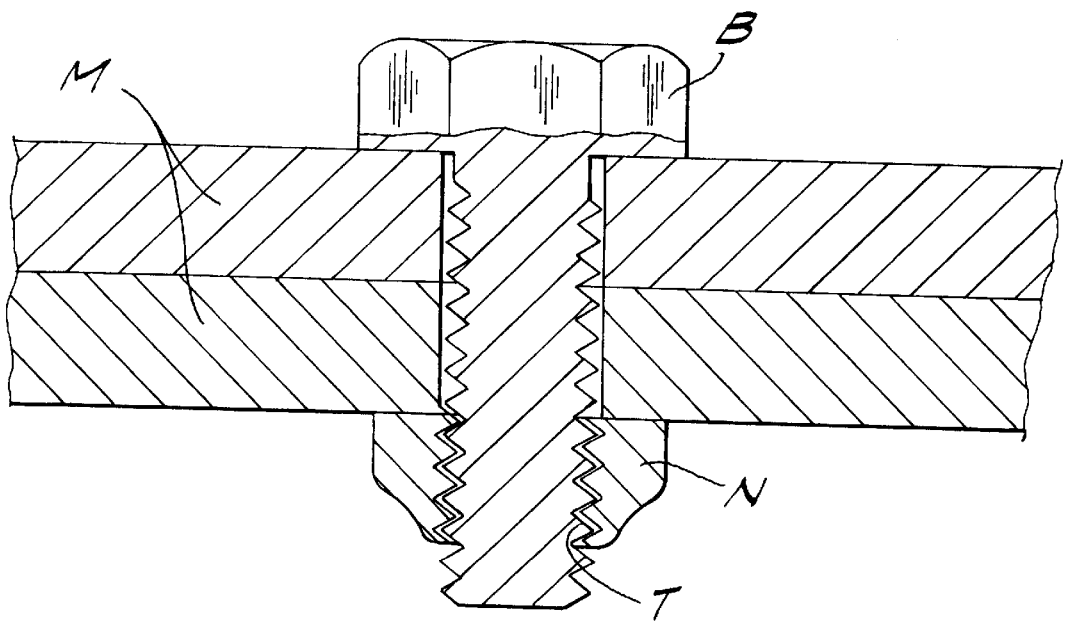
FIG. 1 is a cross-sectional view of a prior art locking fastener connecting two members together.
Figure 2:
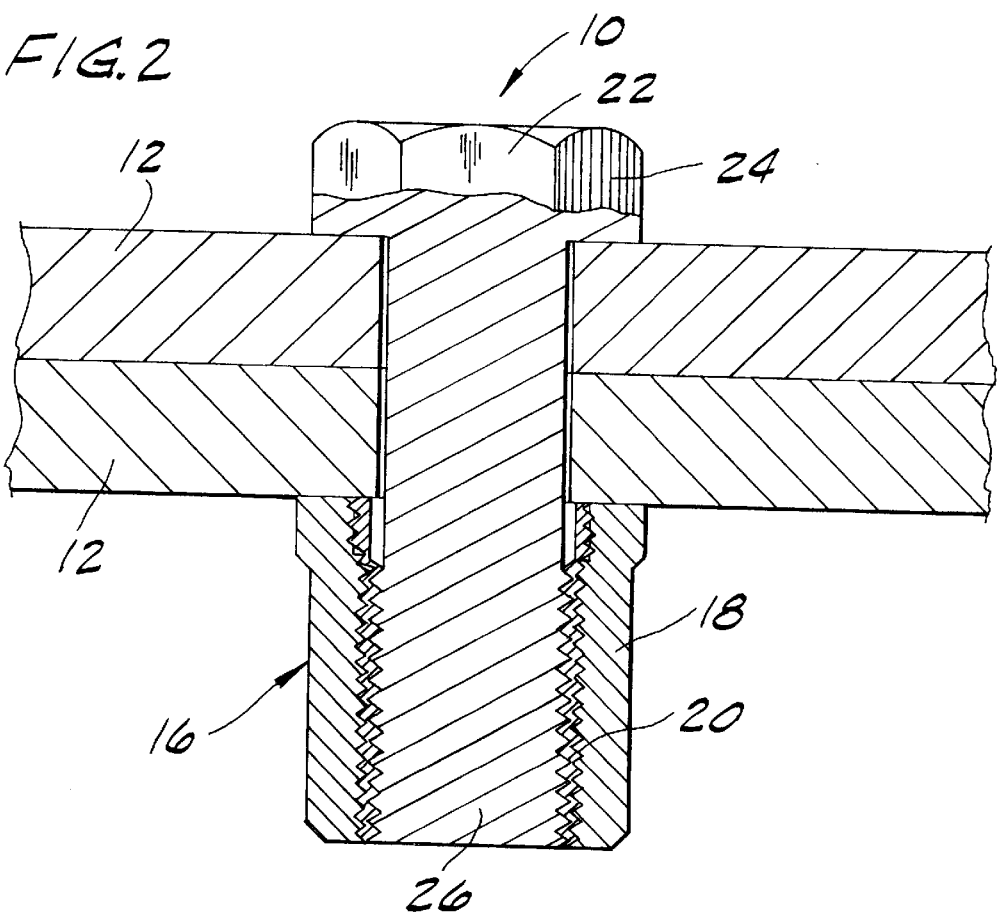
FIG. 2 is a cross-sectional view of a locking fastener of the present invention connecting two members together.

Referring now to the drawings, and first to FIG. 2, a locking fastener of the present invention is generally indicated at 10. The fastener 10 is for use in connecting two members 12 such as a panel and a structural frame member, or a component and a structural frame member, or in joining more than two members together. The fastener 10 comprises a locking nut, generally indicated at 16, having a shell 18 and an insert 20, and a bolt 22. The members 12 are held securely between the bolt 22 and the nut 16 when the locking nut connects the members together.

The bolt 22 has a head 24 and an externally threaded shank 26 extending therefrom. The bolt 22 may have threads formed on only a portion of the shank 26. The bolt 22 is preferably formed from a metal alloy having strength, corrosion resistance, and other characteristics required for the specific application (e.g., a space vehicle or habitat). The diameter of the shank 26 and pitch of the threads should be selected to meet the applicable strength requirements for the bolt 22, as will be readily understood by those of ordinary skill in the art.

The locking nut 16 comprises the shell 18 and the insert 20 and is receivable on the shank 26 of the bolt 22 (FIGS. 2, 3 and 4). The shell 18 has a bore 30 extending generally longitudinally therethrough for receiving the insert 20. At least a portion of a wall of the bore 30 has internal threads 32 formed thereon for engagement with the insert 20. The shell 18 is sized and shaped to permit rotation of the nut 16 on the bolt 22 for tightening the nut on the bolt. An outer surface 33 of the shell 18 is adapted for receiving a tool, such as a wrench and has a polygonal surface 34 for application of the tool. The shell 18 is integrally formed as one piece from a suitable material such as a metal alloy (steel, corrosion resistant steel, titanium, nickel, aluminum, beryllium copper), polymeric material, composite (thermosetting or thermoplastic material), ceramic, or metal matrixes with reinforcing fibers or whiskers of ceramic material. Since the threads in contact with the bolt 22 are formed in the insert 20 rather than the shell 18, the strength of the shell may be reduced since the shell does not need to directly support torquing loads. Thus, the shell 18 may be formed from lower weight materials and by methods other than forging. This reduces the overall weight and cost of the fastener 10 as compared to prior art locking fasteners.

The insert 20 is generally tubular and sized for being received in the bore 30 of the shell 18. The insert 20 has a threaded portion 36 having an outer surface 38 with external threads for threaded engagement with the internal threads, 32 of the shell 18, and an inner surface with internal threads ("thread means") 40 for threaded engagement with the external threads of the bolt 22. The insert 20 is preferably plated to provide lubrication to allow for smooth engagement of the threads of the bolt 22 and the insert, and to prevent galling of the threaded shank 26 when the nut 16 is rotated on the shank. The plating may be silver or any other suitable material. Since the insert 20 is formed separately from the shell 18 and is only located internal to the shell, the entire insert may be plated.

The insert 20 may be formed from a metal alloy or any other suitable material. In applications where the fastener 10 is cyclically exposed to low or high temperature extremes, the insert 20 material should be selected so that the coefficient thermal expansion of the insert corresponds with the coefficient of thermal expansion of the shell 18 material. The insert 20 material should also be selected for compatibility with the material of the bolt 22. The internal threads of the insert 20 are preferably formed on a lathe with a single point tool to increase the accuracy of the threads and provide consistent tightening torques.

Figure 5:
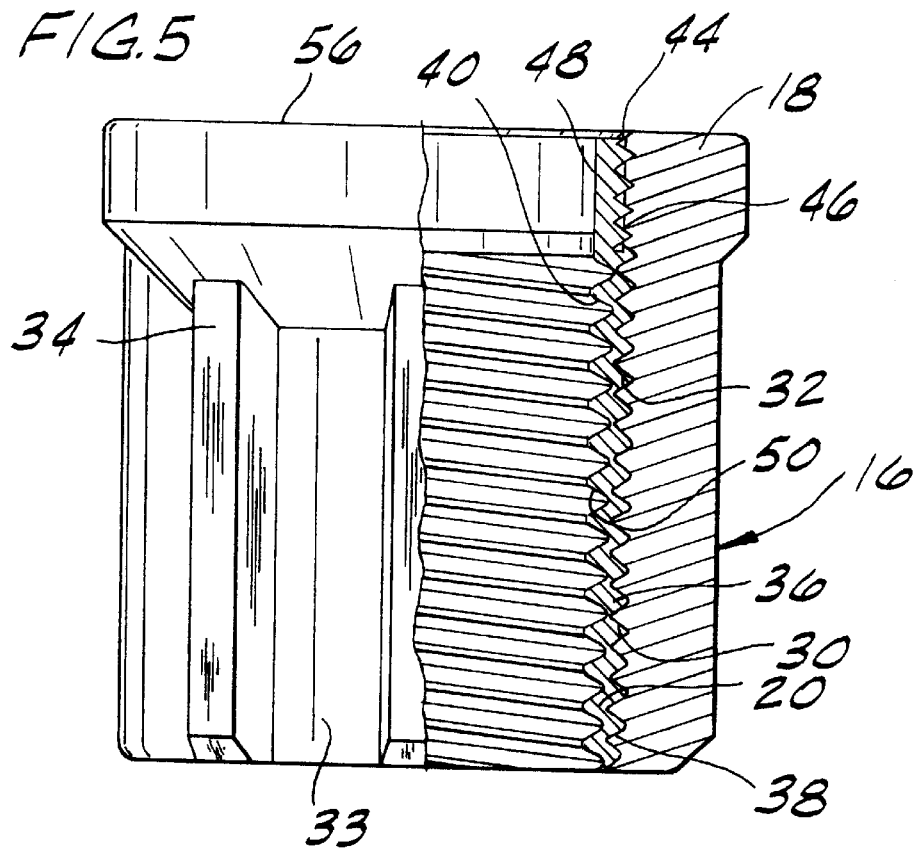
FIG. 5 is the partial cross-sectional view of FIG. 3, but showing the insert prior to locking in the shell.

The insert 20 further comprises a locking portion 44 located at one end of the insert and constructed for interlocking the insert with the shell 18 (FIGS. 3 and 5). The locking portion 44 of the insert 20 has an outer surface with threads 46 formed thereon. An inner surface 48 of the locking portion 44 is free of threads for engagement with a die (not shown) for expansion of the locking portion of the insert when the insert 20 is disposed in the shell bore 30 such that the threads 46 penetrate the shell to prevent rotation of the insert within the shell 18. The external threads 46 of the locking portion 44 of the insert 20 may also have sharp teeth (not shown) extending from the threads for biting into the shell 18. The insert 20 is shown in FIG. 5 prior to expansion of the locking portion 44 of the insert into engagement with shell 18. The locking portion 44 is expandable radially outwardly against the shell 18 to grip or bite into the shell to lock the insert against untorquing rotation, effectively locking the insert 20 in the shell (FIG. 3). The insert 20 is expanded outwardly by an essentially cylindrical expanding tool, as is well known by those skilled in the art. As the locking portion 44 is moved outwardly by the tool, the threads 46 penetrate the inner wall of the shell 18 and cause the material of the shell to flow between and fill the threads 46.

It is to be understood that other types of locking arrangements between the insert 20 and shell 18 may be used without departing from the scope of the invention. For example, the outer surface of the locking portion 44 of the insert 20 may also be free of threads with the adjacent inner surface of the shell 18 having threads. As the insert is expanded the outer surface of the insert is deformed into the thread grooves of the shell to interlock the insert and shell.

Figure 6:
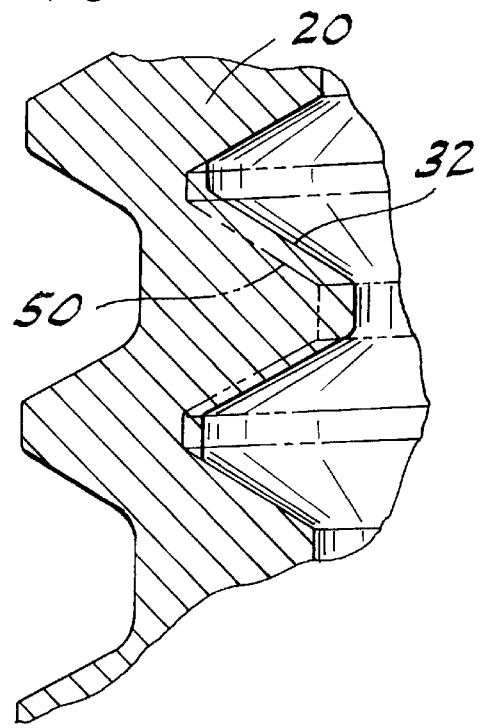
FIG. 6 is an enlarged fragmentary view of the insert illustrating a locking thread.

The insert 20 includes at least one locking internal thread 50 projecting radially inwardly farther than the internal threads of the insert to provide an interference fit between the bolt 22 and nut 16 to prevent loosening of the nut on the bolt due to vibration (FIGS. 3 and 6). Thus as used herein, the internal threads 40 of the insert 20 are conventional threads which facilitate threaded interengagement with the bolt 22 and advancement of the bolt through the nut 16 upon relative rotation of the nut and bolt. The locking internal thread 50, in contrast, is constructed for an interference engagement with the bolt 22 to grip the bolt and prevent relative rotation of the nut 16 and bolt to lock the nut on the bolt. The locking thread 50 is preferably located along a portion of the insert 20 which is not immediately adjacent the end of the insert spaced farthest away from the members 12 connected by the fastener 10. For example, the insert 20 preferably includes at least two internal (i.e., non-locking) threads 40 between an end of the insert and the locking internal thread 50 of the insert. This arrangement permits interlocking of the shank 26 threads with the locking thread 50 before the shank protrudes beyond the free end of shell 18 so that only the smooth rounded surface of the nut 16 is exposed.

The locking thread 50 preferably extends through no fewer than about 1½ convolutions of the internal threads. Any number of internal locking threads 50 may be provided. The internal locking thread 50 is preferably formed in the insert 20 after it has been machined and heat treated and may be formed by a cold-rolling operation, for example. A die (not shown) is used to deform the internal locking thread 50 by rolling the external threads to force the locking thread inward. The location of the threads prior to rolling is shown in phantom in FIG. 6. The formation of the locking thread 50 is well known by those skilled in the art and may be accomplished by methods other than described herein. For example, formation of the internal locking thread 50 may be accomplished as described in U.S. Pat. No. 3,081,808. The internal locking thread 50 provides a tight interference fit between the insert 20 and bolt 22 to prevent the bolt from loosening over time from vibration, for example. The internal locking thread 50 increases the breakaway friction of the bolt 22 so that the breakaway friction required to loosen the bolt is close to the drive torque required to install the bolt.

Figure 7:
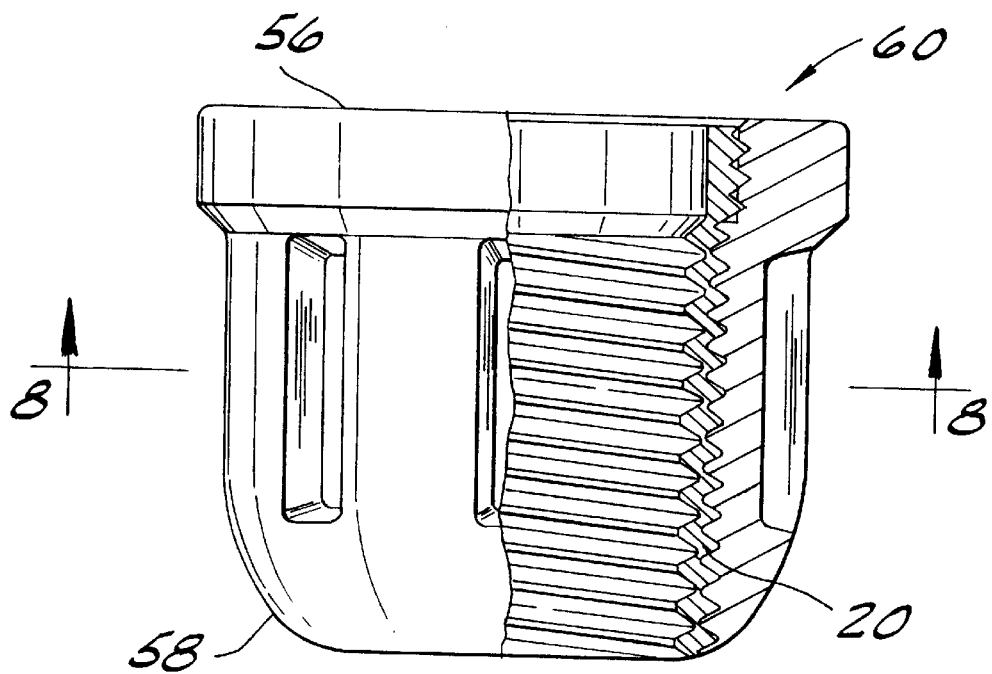
FIG. 7 is a partial cross-sectional view of a second embodiment of a locking nut.
Figure 8:
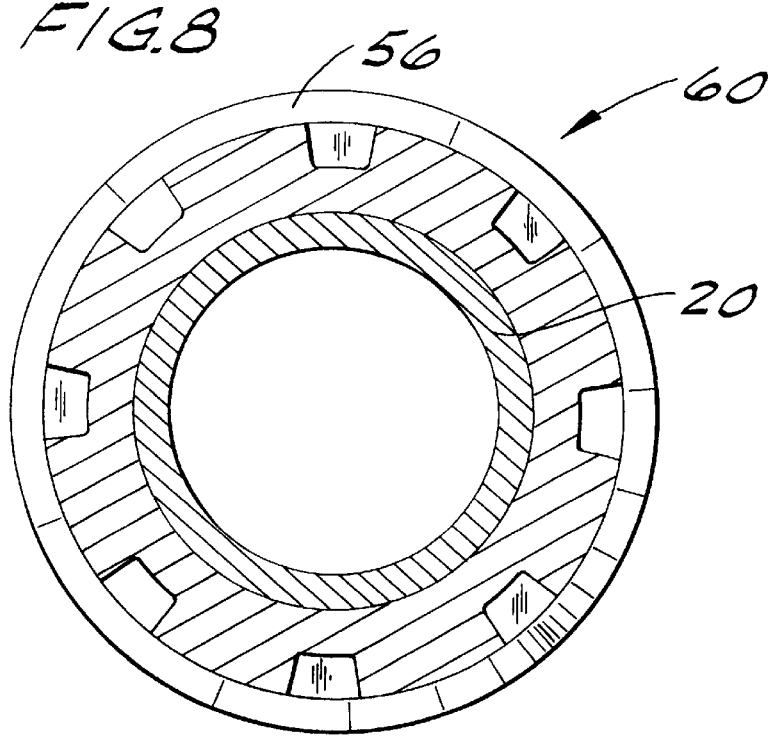
FIG. 8 is a cross section taken in the plane including line 8—8 of FIG. 7.

A first end of the shell 18 has a generally planar compression surface 56 for contact with one of the members 12 when the nut 16 is connecting the members. In a second embodiment (FIG. 7), a second end 58 of the shell 18 has generally rounded shoulders adapted to face away from the member 12 adjacent to the shell such that the nut 16 is free of sharp edges at the second end of the shell. The shell 18 may be formed in many different shapes and sizes and is preferably constructed, such as by formation of wrenching flats, to receive a wrench or other tool for installation or removal of the nut 16. One such configuration (second embodiment) is shown in FIGS. 7 and 8 and generally indicated at 60. Preferably, the insert 20 does not extend axially through the shell 18 all of the way to the plane of the compression surface 56. Should an insert (not shown) project to or beyond the plane of the compression surface, there is a risk that the insert could become jammed into the member 12 and effectively become bonded to the member. The fastener would then be nearly impossible to remove without breaking. This problem is particularly to be avoided on space craft where astronauts have limited capability to deal with broken fasteners.

Figure 9:
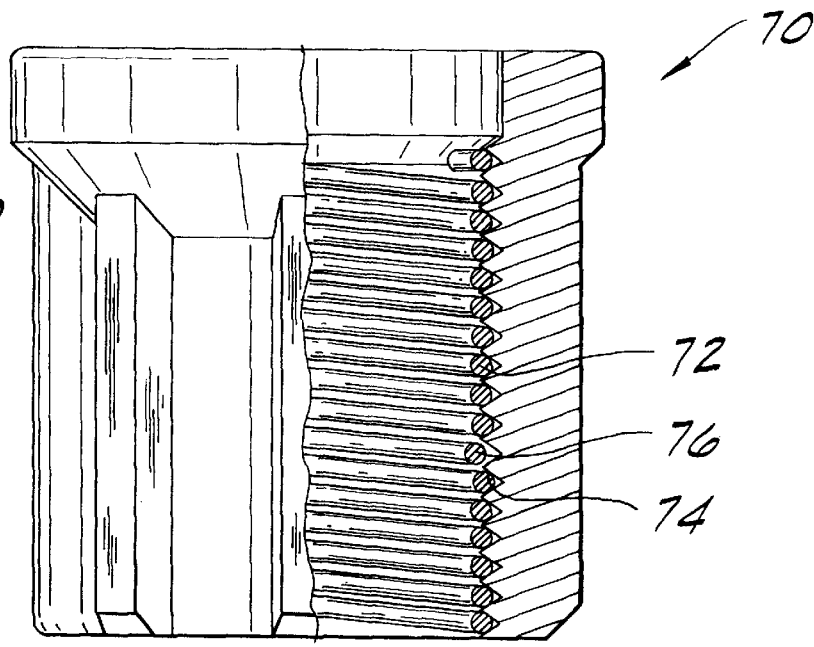
FIG. 9 is a partial cross-sectional view of a third embodiment of a locking nut.

A third embodiment of the fastener of the present invention is shown in FIG. 9, and generally indicated at 70. The fastener is similar to the first embodiment 10 except that the tubular insert is replaced with a generally helically shaped wire 72. The wire 72 is sized for being received in the bore 74 of the shell 18 and forms internal threads for engagement with the external threads of the bolt 22. The wire 72 is preferably made from a corrosion resistant alloy and has a diamond shaped cross-section. The wire 72 is available under the trade name HELI-COIL from many commercial suppliers, such as Microdot Company of Placentia, Calif. The wire 72 has a locking portion 76 located along a central portion of the wire. The locking portion 76 is formed by inserting bends into one or more insert coils to form a series of chords, as is well known by those skilled in the art.

Figure 10:
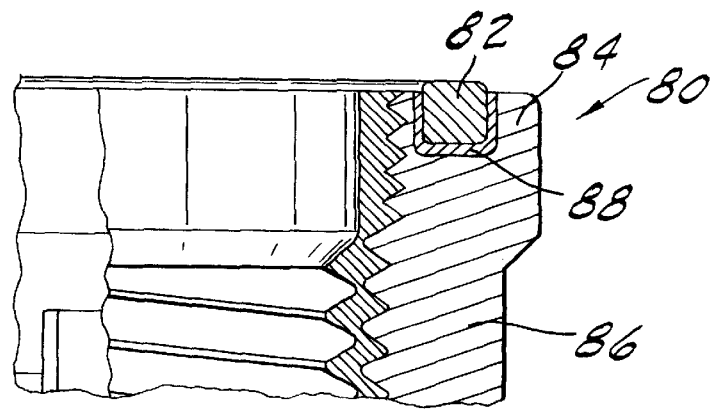
FIG. 10 is a fragmentary partial cross-sectional view of a fourth embodiment of a locking nut having a sealing member.
Figure 11:
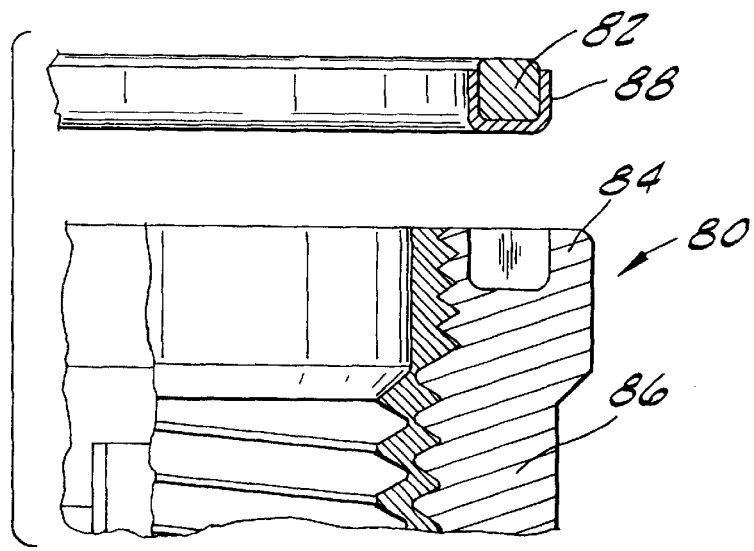
FIG. 11 is the fragmentary, partial cross-sectional view of FIG. 10 showing the sealing member exploded from the nut.

A fourth embodiment of the present invention is generally indicated at 80, and shown in FIGS. 10 and 11. An annular sealing member 82 extends from a compression surface 84 of the shell 86 for compression between the shell and the member to form a seal between the compression surface of the shell and the member to prevent leakage of fluid through the members in a direction from the head 24 of the bolt 22 towards the nut 16. A circumferential groove 85 is formed in the compression surface 84 of the shell 86. The sealing member 82 having a cross-sectional diameter greater than the depth of the groove is placed in the groove. The sealing member 82 extends beyond the compression surface 84 of the shell 86 to provide a tight seal upon engagement of the compression surface and the member. A U-shaped retainer 88 is interposed between the shell 86 and the sealing member 82 to hold the O-ring in place. It is to be understood that the sealing member 82 may be installed without the retainer 88 and that the sealing member may have cross-sections other than shown without departing from the scope of the invention.

Figure 12:
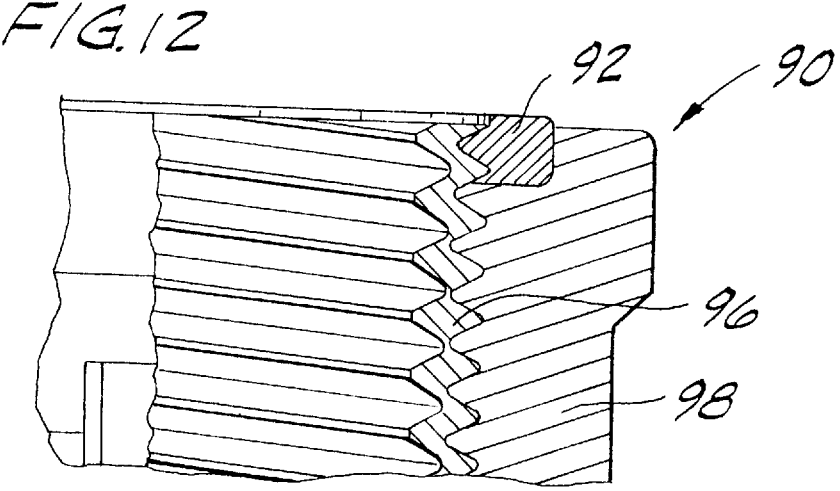
FIG. 12 is a fragmentary partial cross-sectional view of a fifth embodiment of a locking nut of the present invention.
Figure 13:
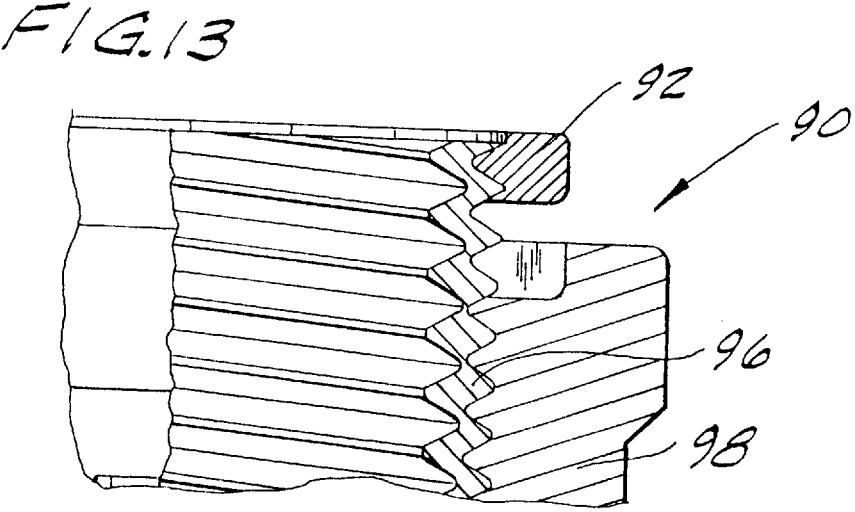
FIG. 13 is the locking nut of FIG. 12 with an insert and sealing member partially installed in a shell.

A fifth embodiment of the fastener of the present invention is shown in FIGS. 12 and 13, and generally indicated at 90. A sealing member comprises an O-ring 92 installed between the insert 96 and the shell 98. This sealing member 92 provides vibration dampening between the insert 96 and shell 98 and further locks the insert within the shell to prevent rotation of the insert relative to the shell.

Figure 14:
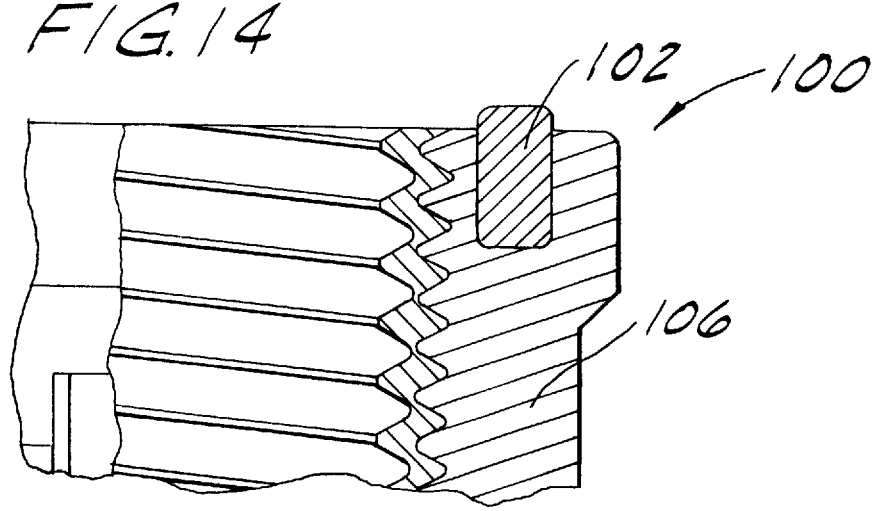
FIG. 14 is a fragmentary partial cross-sectional view of a sixth embodiment of a locking nut of the present invention.
Figure 15:
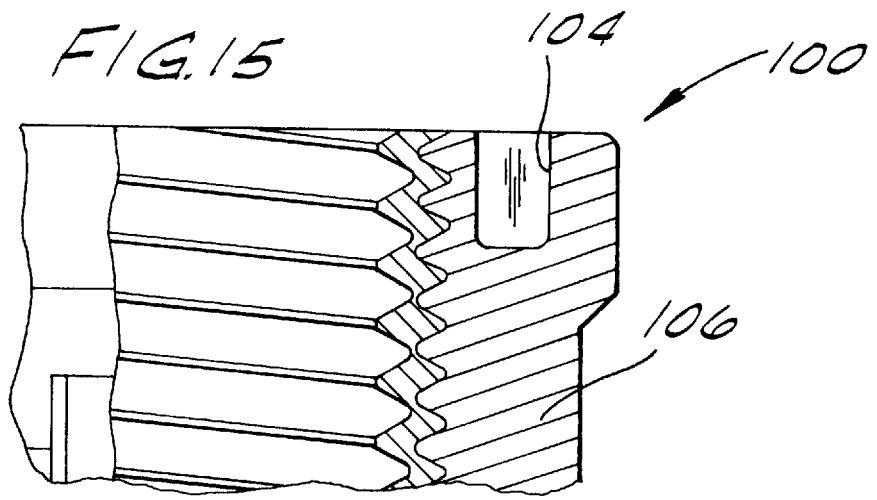
FIG. 15 is the locking nut of FIG. 14 without the sealing member installed.

FIGS. 14 and 15 show a sixth embodiment of the present invention, generally indicated at 100. A sealing member 102 is inserted directly into a groove 104 in the shell 106. The sealing member 102 may be cast into the shell 106 or bonded directly to the shell.

Figure 16:
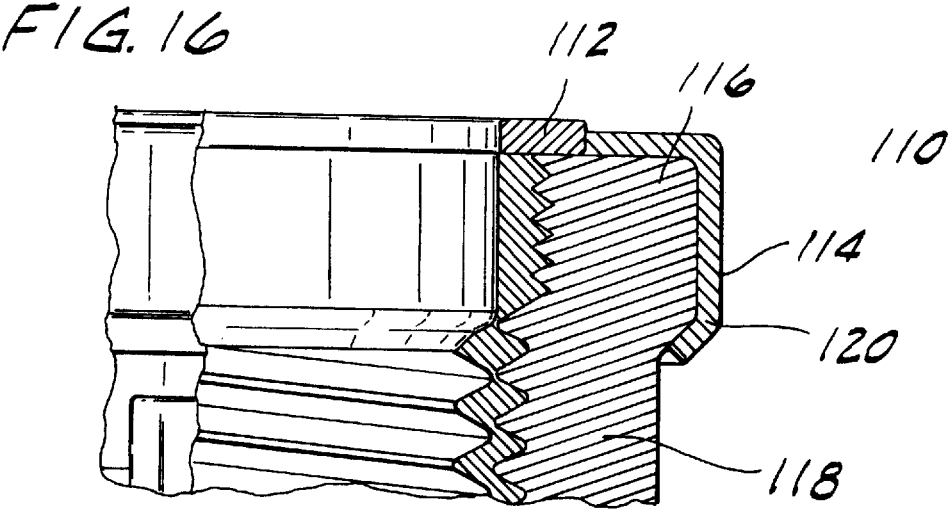
FIG. 16 is a ragmentary partial cross-sectional view of a seventh embodiment of a locking nut of the present invention.
Figure 17:
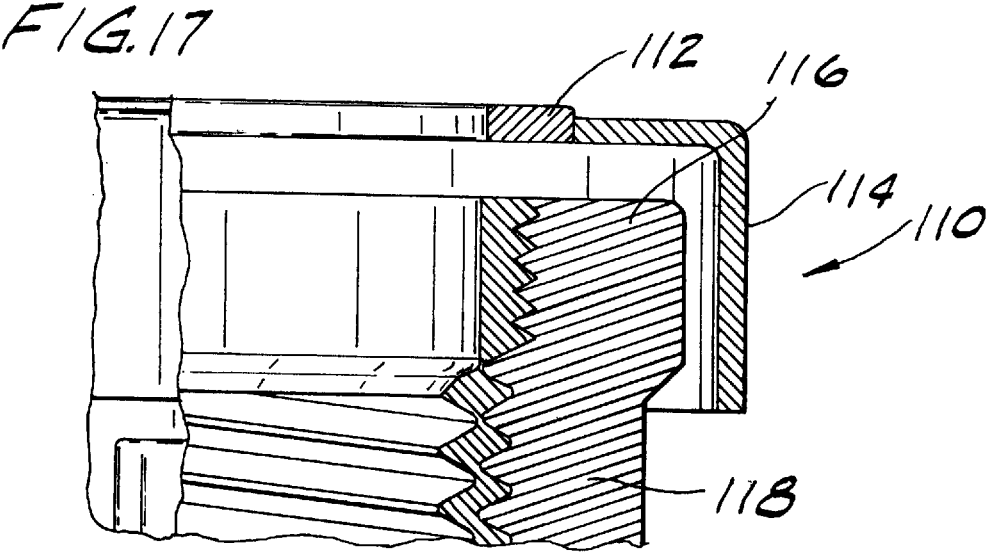
FIG. 17 is an exploded view of the locking nut of FIG. 16.

A seventh embodiment of the present invention is shown in FIGS. 16 and 17, and generally indicated at 110. A sealing member 112 is connected to the end of a retainer 114 for retaining the sealing member on a compression surface 116 of the shell 118. The retainer 114 has a cylindrical flange 120 which is swaged over an end of the shell 118 to lock the retainer in place.

The fourth through seventh embodiments are illustrated as possible seals which might be used with the fastener of the present invention. However, no seal may be used, or seals of a different construction without departing from the scope of the present invention.

An eighth embodiment of a nut of a locking fastener of the present invention is shown in FIGS. 18 and 19, and generally indicated at 130. An insert 132 of the fastener nut has a first locking ring 134 located at a first end of the insert and a second locking ring 136 located at a second end of the insert. The locking rings 134, 136 extend circumferentially around the insert, but have no axial extension. Thus, the locking rings 134, 136 do not function as threads. As shown in FIG. 18, the locking rings 134, 136 are located radially inwardly of the outer surface of the insert 132 so that they do not engage threads 138 of a shell 140 of the nut.

The shell 140 has two annular grooves 142 spaced apart axially in the bore of the shell. As installed, the first and second locking rings 134, 136 are generally aligned with corresponding ones of the annular grooves 142. The insert 132 is then swaged at its ends so that the locking rings 134, 136 are deformed radially outwardly from the outer surface of the insert and into their respective grooves 142 to lock the insert in with the shell 140 at opposite ends of the insert, as is shown in FIG. 19.

A ninth embodiment of a nut of a locking fastener of the present invention is shown in FIG. 20, and generally indicated at 150. The fastener is similar in structure to the fastener 130 of the eighth embodiment. However, an insert 152 of the fastener 150 of the ninth embodiment is secured to a shell 154 of the fastener not solely by swaging of the insert. As with the fastener 130, the insert 152 has first and second locking rings 156, 158 which are swaged into respective grooves in the shell 154. In the ninth embodiment, the insert 152 is also joined to the shell 154 by brazing.

The insert 152 has a plating of silver for lubrication purposes. The silver plating can also serve as the filler material for a braze joint between the insert 152 and the shell 154. It is understood that although silver has several alloys which can be used for brazing, (e.g., gold and platinum), it is believed that pure silver would provide a sound braze joint as well as lubrication for the subsequent installation of the fastener 150. The brazed joint is indicated by reference numeral 160 in FIG. 20.

Preferably the brazed joint 160 would be formed by placing the inserts 152 and shells 154, with the inserts already having been swaged in the shells as shown in FIG. 20, into an oven having a carefully controlled atmosphere. The oven atmosphere could preferably be either a vacuum or an inert atmosphere. Care during brazing is essential so that the silver on the internal threads which is not used to join the insert 152 and shell 154 is not damaged or diminished in thickness during brazing. The temperature in the oven should not be so great, or the oven brazing process so long that the metallurgy of the insert 152 and shell 154 are compromised.

In the event any sharp edges of the insert 152 extend beyond the end of the shell 154, the protruding end of the insert is preferably removed by grinding after the brazing process. The insert 152 is preferably perfectly flush with the free end of the shell 154 (i.e., the end of the shell opposite the compression surface which engages the members to be joined by the fastener 150). The grinding away of any protruding portion of the insert 152 also has the benefit of removal of any exposed silver on the insert 152 prior to its installation on a spacecraft.

It is envisioned that the insert 152 and shell 154 could also be secured using a thread locking compound, such as one of the commercially available LOCTITE thread locking compounds available from Loctite Corporation of Hartford, Connecticut. The thread locking compound is not illustrated, but would essentially take the place of the brazed joint 160 illustrated in FIG. 20. The thread locking compound would be used in place of the brazed joint described above. However, the thread locking compound could be used in conjunction with swaging of the locking rings 156, 158 of the insert 152. The thread locking compound would be applied on top of the silver plating on the outer surface of the insert 152.

It will be observed from the foregoing that the locking fastener 10, 60, 70, 80, 90, 100, 110, 130, 150 of the present invention has numerous advantages. Importantly, the fastener does not have the sharp threaded end of a bolt extending beyond the nut, thus eliminating any need for encapsulating the end of the fastener. Furthermore, the nut has plating on only internal surfaces which reduces the chances of contamination due to flaking or oxidizing of the plating. Conventional fasteners can be easily retrofitted by machining the bore of a conventional nut and inserting the insert into the nut. The quality of the threads on the nut which engage the bolt is improved over conventional tapped threads. The insert permits a better distribution of the load over the length of the bolt. The fastener of the present invention also has improved resistance of loosening and improved fatigue resistance in situations where the fastener is subject to acoustic loading.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A locking nut for use with a bolt for connecting members together, the bolt having a head and a shank, the members being disposed between the head and the nut when the locking nut connects the members together, at least a portion of the shank having external threads formed thereon, the locking nut comprising:

a shell having a bore extending therethrough for receiving the bolt, at least a portion of a wall of the bore having internal threads formed thereon, the shell being sized and shaped to permit rotation of the nut on the bolt for tightening the nut on the bolt; and a generally tubular insert sized for being received in the bore of the shell and comprising a threaded portion having an outer surface with external threads for threaded engagement with the internal threads of the shell, and an inner surface with internal threads for threaded engagement with the external threads of the bolt, and a locking portion constructed for interlocking the insert with the shell;

the insert being plated and the shell being free of plating.

2. A locking nut as set forth in claim 1 wherein the locking portion of the insert has an outer surface with threads formed thereon, and an inner surface being free of threads for engagement with a die for expansion of the locking portion of the insert when the insert is disposed in the shell bore such that the threads on the surface penetrate the shell to prevent rotation of the insert within the shell.

3. A locking nut as set forth in claim 1 wherein the insert comprises at least one locking internal thread projecting radially inwardly farther than the other internal threads of the insert to provide an interference fit between the bolt and nut to prevent loosening of the nut on the bolt due to vibration.

4. A locking nut as set forth in claim 3 wherein at least two internal threads are located between an end of the insert and the locking internal thread of the insert.

5. A locking nut as set forth in claim 1 wherein the plating is silver plating.

6. A locking nut as set forth in claim 1 wherein the shell is formed from a material selected from a group comprising metal, polymeric, composite, and ceramic.

7. A locking nut as set forth in claim 1 wherein the shell has a first end having a generally planar compression surface for contact with one of the members, and a second end having generally rounded shoulders adapted to face away from the one member such that the nut is free of sharp edges at the second end of the shell.

8. A locking nut as set forth in claim 1 wherein the shell includes an outer surface constructed for engagement with a wrench.

9. A locking nut as set forth in claim 1 further comprising a sealing member extending from a compression surface of the shell for compression between the shell and one of the members to form a seal between the compression surface of the shell and the member to prevent leakage of fluid through the members in a direction from the head of the bolt towards the nut.

10. A locking nut as set forth in claim 9 wherein the shell includes a circumferential groove in the compression surface of the shell and the sealing member comprises an o-ring having a cross-sectional diameter greater than the depth of the groove.

11. A locking nut as set forth in claim 9 wherein the shell includes a circumferential groove in the compression surface extending radially outwardly from the bore of the shell, the sealing member being located in the groove and interposed between the insert and shell.

12. A locking nut as set forth in claim 9 further comprising a retainer for retaining the sealing member on the compression surface of the shell, the retainer having a cylindrical flange for engagement with an outer surface of the shell.

13. A locking nut as set forth in claim 1 wherein the locking portion of the insert comprises a locking ring located generally at a first end of the insert, the locking ring being disposed radially inwardly of the outer surface of the insert such that the locking ring does not engage the internal threads of the shell upon installation therein, and wherein the shell has an annular groove in its bore, the locking ring being deformable after installation in the shell into the groove for interlocking the insert with the shell.

14. A locking nut as set forth in claim 13 wherein the locking ring comprises a first locking ring, the locking portion further comprising a second locking ring located generally at a second end of the insert, the second ring being disposed radially inwardly of the outer surface of the insert such that the second locking ring does not engage the internal threads of the shell upon installation therein, and wherein the annular groove in the shell comprises a first annular groove, the shell having a second annular groove in its bore which is axially spaced from the first annular groove, the second locking ring being deformable after installation in the shell into the second groove for interlocking the insert with the shell.

15. A locking nut as set forth in claim 14 wherein the insert has silver plating thereon, the silver plating disposed between the shell and the insert bonding the insert to the shell.

16. A locking nut as set forth in claim 1 wherein the insert has plating thereon, the plating disposed between the shell and the insert bonding the insert to the shell.

17. A locking nut as set forth in claim 1 further comprising adhesive material disposed between the insert and the shell and bonding the insert to the shell.

18. A locking nut as set forth in claim 1 wherein the insert is yieldable for elongation upon tightening of the bolt in the shell thereby to distribute a load from the bolt over substantially the entire length of engagement of the bolt with the insert in the shell.

19. A locking nut for use with a bolt for connecting members together, the bolt having a head and a shank, the members being disposed between the head and the nut when the locking nut connects the members together, at least a portion of the shank having external threads formed thereon, the locking nut comprising:
- a shell having a bore extending therethrough for receiving the bolt, the shell being sized and shaped to permit rotation of the nut on the bolt for tightening the nut on the bolt; and
- an insert comprising a wire sized for being received in the bore of the shell, the wire forming internal threads for engagement with the external threads of the bolt, the wire having a locking portion located along a central portion of the insert to prevent loosening of the bolt due to vibration.

20. A locking nut as set forth in claim 19 wherein the wire is generally helically shaped.

21. A locking nut as set forth in claim 19 wherein the shell is formed from a material selected from a group comprising metal, polymeric, composite, and ceramic.

22. A locking nut as set forth in claim 19 wherein the shell has a first end having a generally planar compression surface for contact with one of the members, and a second end having generally rounded shoulders adapted to face away from said one member such that the nut is free of sharp edges at the second end of the shell.

23. A locking nut as set forth in claim 22 wherein the shell includes an outer surface constructed for engagement with a wrench.

24. A locking nut as set forth in claim 19 further comprising a sealing member extending from a compression surface of the shell for compression between the shell and one of the members to form a seal between the compression surface of the shell and the member to prevent leakage of fluid through the members in a direction from the head of the bolt towards the nut.

25. A locking nut for use with a bolt for connecting members together, the bolt having a head and a shank, the members being disposed between the head and the nut when the locking nut connects the members together, at least a portion of the shank having external threads formed thereon, the locking nut comprising:
- a shell having a bore extending therethrough for receiving the bolt, at least a portion of a wall of the bore having internal threads formed thereon, the shell being sized and shaped to permit rotation of the nut on the bolt for tightening the nut on the bolt; and
- a generally tubular insert sized for being received in the bore of the shell and comprising a threaded portion having an outer surface with external threads for threaded engagement with the internal threads of the shell, and an inner surface with internal threads for threaded engagement with the external threads of the bolt, and a locking portion constructed for interlocking the insert with the shell;
- the shell having a first end having a generally planar compression surface for contact with one of the members, and a second end having generally rounded shoulders adapted to face away from the one member such that the nut is free of sharp edges at the second end of the shell.

26. A locking nut as set forth in claim 25 wherein the insert is yieldable for elongation upon tightening of the bolt in the shell thereby to distribute a load from the bolt over substantially the entire length of engagement of the bolt with the insert in the shell.

27. A locking nut as set forth in claim 25 wherein the insert comprises at least one locking internal thread projecting radially inwardly farther than the other internal threads of the insert to provide an interference fit between the bolt and nut to prevent loosening of the nut on the bolt due to vibration, and wherein at least two internal threads are located between an end of the insert and the locking internal thread of the insert such that the bolt is engageable with the locking internal thread without the shank extending beyond an end of the shell.

28. A locking nut as set forth in claim 25 wherein the insert has plating thereon, the plating disposed between the shell and the insert bonding the insert to the shell.

29. A locking nut as set forth in claim 25 further comprising adhesive material disposed between the insert and the shell and bonding the insert to the shell.

30. A locking nut for use with a bolt for connecting members together, the bolt having a head and a shank, the members being disposed between the head and the nut when the locking nut connects the members together, at least a portion of the shank having external threads formed thereon, the locking nut comprising:
- a shell having a bore extending therethrough for receiving the bolt, at least a portion of a wall of the bore having internal threads formed thereon, the shell being sized and shaped to permit rotation of the nut on the bolt for tightening the nut on the bolt; and
- a generally tubular insert sized for being received in the bore of the shell and comprising a threaded portion having an outer surface with external threads for threaded engagement with the internal threads of the shell, and an inner surface with internal threads for threaded engagement with the external threads of the bolt, and a locking portion constructed for interlocking the insert with the shell;
- the locking portion of the insert comprising a locking ring located generally at a first end of the insert, the locking ring being disposed radially inwardly of the outer surface of the insert such that the locking ring does not engage the internal threads of the shell upon installation therein, and wherein the shell has an annular groove in its bore, the locking ring being deformable after installation in the shell into the groove for interlocking the insert with the shell.

31. A locking nut as set forth in claim 30 wherein the locking ring comprises a first locking ring, the locking portion further comprising a second locking ring located generally at a second end of the insert, the second ring being disposed radially inwardly of the outer surface of the insert such that the second locking ring does not engage the internal threads of the shell upon installation therein, and wherein the annular groove in the shell comprises a first annular groove, the shell having a second annular groove in its bore which is axially spaced from the first annular groove, the second locking ring being deformable after installation in the shell into the second groove for interlocking the insert with the shell.

32. A locking nut as set forth in claim 30 wherein the insert has plating thereon, the plating disposed between the shell and the insert bonding the insert to the shell.

33. A locking nut as set forth in claim 30 further comprising adhesive material disposed between the insert and the shell and bonding the insert to the shell.

34. A locking nut as set forth in claim 30 wherein the insert is yieldable for elongation upon tightening of the bolt in the shell thereby to distribute a load from the bolt over substantially the entire length of engagement of the bolt with the insert in the shell.

35. A locking nut for use with a bolt for connecting members together, the bolt having a head and a shank, the members being disposed between the head and the nut when the locking nut connects the members together, at least a portion of the shank having external threads formed thereon, the locking nut comprising:

a shell having a bore extending therethrough for receiving the bolt, at least a portion of a wall of the bore having internal threads formed thereon, the shell being sized and shaped to permit rotation of the nut on the bolt for tightening the nut on the bolt;

a generally tubular insert sized for being received in the bore of the shell and comprising a threaded portion having an outer surface with external threads for threaded engagement with the internal threads of the shell, and an inner surface with internal threads for threaded engagement with the external threads of the bolt, and a locking portion constructed for interlocking the insert with the shell; and adhesive material disposed between the insert and the shell and bonding the insert to the shell.

36. A locking nut as set forth in claim 35 wherein the adhesive material is disposed between the insert and the shell so as to prevent loosening of the nut on the bolt due to vibration.

37. A locking nut as set forth in claim 35 wherein the adhesive material is disposed between the insert and the shell so as to dampen vibrational energy.

38. A locking nut as set forth in claim 35 wherein the insert is yieldable for elongation upon tightening of the bolt in the shell thereby to distribute a load from the bolt over substantially the entire length of engagement of the bolt with the insert in the shell.

39. A locking nut for use with a bolt for connecting members together, the bolt having a head and a shank, the members being disposed between the head and the nut when the locking nut connects the members together, at least a portion of the shank having external threads formed thereon, the locking nut comprising:

a shell having a bore extending therethrough for receiving the bolt, at least a portion of a wall of the bore having internal threads formed thereon, the shell being sized and shaped to permit rotation of the nut on the bolt for tightening the nut on the bolt; and a generally tubular insert sized for being received in the bore of the shell and comprising a threaded portion having an outer surface with external threads for threaded engagement with the internal threads of the shell, and an inner surface with internal threads for threaded engagement with the external threads of the bolt, and a locking portion constructed for interlocking the insert with the shell;

the insert being yieldable for elongation upon tightening of the bolt in the shell thereby to distribute a load from the bolt over substantially the entire length of engagement of the bolt with the insert in the shell.

40. A locking nut as set forth in claim 39 wherein the insert comprises at least one locking internal thread projecting radially inwardly farther than the other internal threads of the insert to provide an interference fit between the bolt and nut to prevent loosening of the nut on the bolt due to vibration, and wherein at least two internal threads are located between an end of the insert and the locking internal thread of the insert such that the bolt is engageable with the locking internal thread without the shank extending beyond an end of the shell.

41. A locking nut as set forth in claim 39 wherein the shell is formed from a material selected from a group comprising metal, polymeric, composite, and ceramic.

42. A locking nut as set forth in claim 39 wherein the shell includes an outer surface constructed for engagement with a wrench.

43. A locking nut as set forth in claim 39 further comprising a sealing member extending from a compression surface of the shell for compression between the shell and one of the members to form a seal between the compression surface of the shell and the member to prevent leakage of fluid through the members in a direction from the head of the bolt towards the nut.

44. A locking nut as set forth in claim 39 in combination with the connecting members, the connecting members having generally smooth aligned bores for receiving the shank of the bolt, the insert terminating generally before an end of the nut located adjacent to the members and not extending into the bores of the members so that the bolt is free to move axially within the aligned bores.

45. A locking nut as set forth in claim 39 wherein the locking portion of the insert comprises a first locking ring located generally at a first end of the insert and a second locking ring located generally at a second end of the insert opposite the first end, the locking rings being disposed radially inwardly of the outer surface of the insert such that the locking rings do not engage the internal threads of the shell upon installation therein, and wherein the shell has axially spaced apart annular grooves in its bore, the first and second locking rings being deformable after installation in the shell into respective ones of the grooves for interlocking the insert with the shell.

46. A locking nut as set forth in claim 30 wherein the insert has silver plating thereon, the silver plating disposed between the shell and the insert bonding the insert to the shell.

47. A locking nut as set forth in claim 39 wherein the insert has plating thereon, the plating disposed between the shell and the insert bonding the insert to the shell.

* * * * *

UNITED STATES PATENT AND TRADEMARK OFFICE
CERTIFICATE OF CORRECTION

PATENT NO.  : 5,860,779
DATED       : January 19, 1999
INVENTOR(S) : Rahmatollah F. Toosky et al.

It is certified that error appears in the above-identified patent and that said Letters Patent is hereby corrected as shown below:

Column 1, line 3, insert the following:

"This invention was made under Contract No. NAS15-10000 awarded by NASA. The Government has certain rights in this invention."

Signed and Sealed this

Twentieth Day of July, 1999

*Attest:*

*Attesting Officer*

Q. TODD DICKINSON

*Acting Commissioner of Patents and Trademarks*